(12) United States Patent
Faul et al.

(10) Patent No.: US 6,395,852 B1
(45) Date of Patent: May 28, 2002

(54) FLOW ENHANCER FOR PETROLEUM MIDDLE DISTILLATES

(75) Inventors: Dieter Faul, Niederkirchen; Bernd Wenderoth, Lampertheim; Gabriele Dralle-Voss, Alsbach-Hähnlein; Gunnar Schornick, Neuleiningen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/423,116

(22) PCT Filed: May 7, 1998

(86) PCT No.: PCT/EP98/02686

§ 371 (c)(1),
(2), (4) Date: Nov. 2, 1999

(87) PCT Pub. No.: WO98/51719

PCT Pub. Date: Nov. 19, 1998

(30) Foreign Application Priority Data

May 9, 1997 (DE) .......................................... 197 19 689

(51) Int. Cl.$^7$ .............................................. C08F 124/00
(52) U.S. Cl. .................... 526/266; 526/316; 526/318.2; 526/321; 526/348
(58) Field of Search ................................. 526/266, 316, 526/318.2, 321, 348

(56) References Cited

U.S. PATENT DOCUMENTS

| | | |
|---|---|---|
| 3,048,479 A | 8/1962 | Ilnyckj et al. |
| 3,627,838 A | 12/1971 | Ilnyckj et al. |
| 4,009,110 A | 2/1977 | Topfl et al. |
| 5,726,266 A | 3/1998 | Faul et al. |

FOREIGN PATENT DOCUMENTS

| | | |
|---|---|---|
| DE | 25 31 194 | 3/1976 |
| WO | 90/12821 | 11/1990 |
| WO | 95/25755 | 9/1995 |

*Primary Examiner*—Helen L. Pezzuto
(74) *Attorney, Agent, or Firm*—Keil & Weinkauf

(57) ABSTRACT

A copolymer of the monomers of the following components A to C and, if required, D, the total amount by weight of which is 100 mol %:

a: from 20 to 80 mol % of at least one ethylenically unsaturated dicarboxylic acid or of an anhydride, ester and/or amide thereof as component A, b: from 1 to 79 mol % of at least one diketene of the general formula (I)

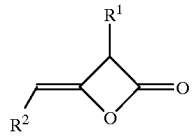

where $R^1$ and $R^2$ independently are each hydrogen or $C_1$–$C_{30}$-alkyl, as component B, c: from 1 to 79 mol % of at least one vinyl ester, alkyl (meth)acrylate, (meth)acrylonitrile or mixtures thereof as component C and d: from 0 to less than 0.5 mol % or, if at least 20 mol % of component C are present, from 0 to 20 mol % of at least one further olefinically unsaturated monomer as component D, is used as a flow improver in mineral oil middle distillates.

9 Claims, No Drawings

FLOW ENHANCER FOR PETROLEUM MIDDLE DISTILLATES

The present invention relates to copolymers, processes for their preparation, mixtures and concentrates containing them and mineral oil middle distillate compositions and their use as flow improvers and paraffin dispersants.

Middle distillates, such as gas oils, diesel oils and heating oils, which are obtained from mineral oil by distillation, have different contents of paraffins, depending on the origin of the crude oil. Precipitation of solid paraffins occurs at low temperatures. The term cloud point (CP) of the raffinate is used. On further cooling, the lamellar n-paraffin crystals form a house-of-cards structure which leads to setting of the middle distillate although the predominant part of the middle distillate is still liquid. The flowability of the mineral oil distillate fuels is considerably impaired by the precipitated n-paraffins in the temperature range between cloud point (CP) and pour point. The paraffins block filters and result in nonuniform or no fuel feed to the combustion units. Similar faults occur in the case of heating oils.

It has long been known that the crystal growth of the paraffins in the mineral oil middle distillates, combustion fuels and power fuels can be modified by suitable additives. Effective additives prevent the paraffins from forming such house-of-cards structures in the middle distillates and from becoming solid at temperatures only a few degrees Celsius below the temperature at which the first paraffin crystals crystallize out. Instead, fine, well crystallized, separate paraffin crystals are formed, said crystals passing through filters in motor vehicles and heating installations or at least forming a filter cake which is permeable for the liquid part of the middle distillates, so that trouble-free operation is ensured.

Depending on the origin of the crude oil and on the refinery cut, there are however middle distillates in which conventional flow improvers exhibit insufficient response if any at all.

A further disadvantage of conventional flow improvers is based on the fact that, owing to their density being higher than the liquid part, the precipitated paraffin crystals tend increasingly to settle out on the bottom of the container during storage. This results in the formation of a homogeneous low-paraffin phase in the upper part of the container and of a two-phase paraffin-rich layer at the bottom. Since, both in vehicle tanks and in storage or delivery tanks of the mineral oil dealers, the middle distillate is generally withdrawn slightly above the bottom of the container, there is a danger that the high concentration of solid paraffins will lead to blockages of filters and metering means. This danger is all the greater the further the storage temperature falls below the cloud point of the middle distillate, since the amount of precipitated paraffin increases with decreasing temperature.

The mode of action of the conventional flow improvers and paraffin dispersants is based on the modification of the paraffin crystals. These are generally polymers which change the crystal growth of the n-paraffins by cocrystallization (interaction) and thus improve the flow properties of the middle distillate at low temperatures. According to DIN EN 116, the efficiency of the flow improvers is expressed indirectly by measurement of the Cold Filter Plugging Point (CFPP).

Ethylene/vinyl carboxylate copolymers, as disclosed, for example, in U.S. Pat. Nos. 3,048,479 and 3,627,838, have long been used as flow improvers.

WO 95/25755 describes flow improvers based on a copolymer of diketene, unsaturated dicarboxylic acids and olefins.

It is an object of the present invention to provide flow improvers and paraffin dispersants which are effective also in critical mineral oil middle distillates in which conventional flow improvers exhibit insufficient response if any at all.

We have found that this object is achieved, according to the invention, by providing a copolymer of the monomers of the following components A to C and, if required, D, the total amount by weight of which is 100 mol %:

a: from 20 to 80 mol % of at least one ethylenically unsaturated dicarboxylic acid or of an anhydride, ester and/or amide thereof as component A, b: from 1 to 79 mol % of at least one diketene of the general formula (I)

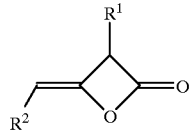

(I)

where $R^1$ and $R^2$ independently are each hydrogen or $C_1$–$C_{30}$-alkyl, as component B, c: from 1 to 79 mol % of at least one vinyl ester, alkyl (meth)acrylate, (meth)acrylonitrile or mixtures thereof as component C and d: from 0 to less than 0.5 mol % or, if at least 20 mol % of component C are present, from 0 to 20 mol % of at least one further olefinically unsaturated monomer as component D.

Certain copolymers which resemble the novel copolymers are known. Copolymers of maleic anhydride, diketene and a vinyl ether are disclosed in DE-A-25 31 194. They are used as surface-active compounds, glass cleaners or builders for solid and liquid synthetic detergents.

DE-A-25 31 195 discloses similar copolymers which are based on maleic anhydride and diketene and, if desired, vinyl ethers. They are used for the antistatic treatment of organic fiber materials or as care agents for color fabrics.

DE-A-39 13 127 discloses copolymers of maleic anhydride, diketene and (meth)acrylic acid. They are used as additives in pulverulent or liquid detergents and cleaning agents.

The components of the novel copolymers are described below.

COMPONENT A

Component A is used in the novel copolymers in an amount of from 20 to 80, preferably from 20 to 70, in particular from 25 to 68, mol %.

Preferably used components A are compounds of the general formula (II)

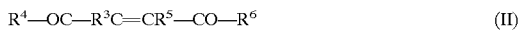

where $R^3$ and $R^5$ independently are each hydrogen or $C_1$–$C_{22}$-alkyl, preferably $C_1$–$C_{10}$-alkyl, in particular $C_1$–$C_6$-alkyl, and $R^4$ and $R^6$ independently are each hydrogen or a radical of an NH-, SH- and/or OH-functional compound, in particular hydrogen, —$SR^7$, —$OR^8$ or —$NR^9R^{10}$, or, in the case of cis-dicarboxylic acid compounds, $R^4$ and $R^6$ together are —O— or —$NR^{11}$— and $R^7$ to $R^{11}$ independently are each $C_1$–$C_{22}$-, preferably $C_1$–$C_{10}$-, in particular $C_1$–$C_6$-alkyl or -hydroxyalkyl or $C_2$–$C_{22}$-alkenyl, preferably $C_2$–$C_{10}$-alkenyl, in particular $C_2$–$C_6$-alkenyl, each of which may be interrupted by up to 3 oxygen atoms and/or aminoalkylated, or a polyether radical or polyamine radical.

If $R^4$ and $R^6$ together form a radical —O—, resulting compounds are acid anhydrides.

Examples of suitable components A are monoethylenically unsaturated dicarboxylic anhydrides of 4 to 8 carbon atoms, such as maleic anhydride, itaconic anhydride, mesaconic anhydride, citraconic anhydride and methylenemalonic anhydride. Among the stated anhydrides, maleic anhydride and itaconic anhydride are preferably used, in particular maleic anhydride.

Dicarboxylic acids, such as fumaric acid, maleic acid, itaconic acid, mesaconic acid, citraconic acid, methylenemalonic acid and their corresponding mono- and dialkyl esters with, preferably, $C_1$–$C_{12}$-alcohols, in particular aliphatic linear $C_1$–$C_6$-alcohols, are furthermore preferred.

The NH- and/or OH-functional compounds may be of the general formula (IV)

(IV)

where m is from 0 to 100, preferably from 0 to 50, in particular from 0 to 20, n and x are each from 0 to 5, $R^{14}$, $R^{15}$ and $R^{16}$ independently are each hydrogen or $C_1$–$C_6$-alkyl and A is $C_2$–$C_{30}$-alkoxy, preferably $C_2$–$C_{20}$-alkoxy, in particular $C_2$–$C_{10}$-alkoxy, especially $C_2$–$C_6$-alkoxy, or $NR^{17}R^{18}$, where one of the radicals $R^{17}$ and $R^{18}$ may be hydrogen and at least one of the radicals $R^{17}$ and $R^{18}$ differs from hydrogen and is $C_1$–$C_{30}$-alkyl, preferably $C_1$–$C_{20}$-alkyl in particular $C_1$–$C_6$-alkyl or $C_2$–$C_{30}$-alkenyl, preferably $C_2$–$C_{20}$-alkenyl, in particular $C_2$–$C_6$-alkenyl, or —[$CHR^{19}$—$CHR^{20}$—O—]$_p$H, $R^{19}$ and $R^{20}$ independently each being hydrogen or $C_1$–$C_6$-alkyl and p being from 1 to 100, preferably from 1 to 50, in particular from 1 to 20.

The values of m, n and p may also be average values if there is a distribution of the amount of these building blocks.

The compound of the general formula (IV) is preferably reacted at the bond which leads to the hydrogen atom on the right.

COMPONENT B

The novel copolymers contain from 1 to 79, preferably from 10 to 60, in particular from 10 to 53, mol % of component B. In the compounds of the general formula (I), $R^1$ and $R^2$, independently of one another, are each hydrogen or $C_1$–$C_{30}$-alkyl, preferably $C_1$–$C_{20}$-alkyl, particularly preferably $C_1$–$C_{10}$-alkyl especially $C_1$–$C_6$-alkyl. An example of a substituted diketene is the distearyldiketene which is sold under the name Basoplast® by BASF and where $R^1$ and $R^2$ are each of 14 to 16 carbon atoms. The unsubstituted diketene ($R^1$ and $R^2$ are each H) is preferably used.

COMPONENT C

The novel copolymers contain from 1 to 79, preferably from 20 to 70, in particular from 22 to 65, mol % of component C. Preferably used components C are vinyl esters of aliphatic $C_1$–$C_6$-carboxylic acids, alkyl (meth)acrylates with aliphatic $C_1$–$C_{12}$-alcohols, preferably $C_1$–$C_6$-alcohols, (meth)acrylonitrile or mixtures thereof. Vinyl esters of aliphatic $C_1$–$C_5$-carboxylic acids and/or (meth)acrylonitrile are particularly preferably used. In particular, vinyl acetate and/or vinyl propionate are used.

COMPONENT D

The novel copolymers contain from 0 to less than 0.5 mol % or, if at least 20 mol % of component C are present, from 0 to 20, preferably from 0 to 10, in particular from 0 to 5, mol % of at least one further olefinically unsaturated monomer. Particularly preferably, no component D is present. If an additional component D is used, it preferably comprises at least one compound of the general formula (III)

(III)

where $R^{12}$ is hydrogen or $C_1$–$C_{12}$-alkyl, preferably $C_1$–$C_6$-alkyl, and $R^{13}$ is hydrogen, $C_1$–$C_{12}$-alkyl, preferably $C_1$–$C_6$-alkyl, $C_2$–$C_{12}$-alkenyl, preferably $C_2$–$C_6$-alkenyl, or $C_6$–$C_{12}$-aryl, preferably phenyl.

In order to obtain a very advantageous effect of the novel copolymers as flow improvers, the amount of component D should be kept small. In particular, no component D is used.

Monomer combinations comprising maleic anhydride, diketene and vinyl acetate or vinyl propionate are particularly preferably used. Furthermore, monomer mixtures comprising $C_{12/14}$-dialkylfumaric esters and/or $C_{16/18}$-dialkylfumaric esters and/or $C_{18/22}$-dialkylfumaric esters, diketene and vinyl acetate or vinyl propionate are preferably used.

Preparation of the Copolymers

For the preparation of the copolymers, the monomers of components A to C and, if desired, D are reacted in the abovementioned ratio in the presence of a free radical polymerization initiator.

It is also possible to carry out the copolymerization of the monomers by a procedure in which, in a first step, at least one ethylenically unsaturated carboxylic acid or an anhydride or ester thereof is used as component A and, in a second step, the copolymer obtained is reacted with an OH- and/or NH-functional compound, as described above in the general formula (IV).

The polymerization of the components A, B, C and, if desired, D is carried out in general in a manner known per se in inert organic solvents under free radical conditions (cf. DE-A-23 42 300 or DE-A-25 31 135). Particularly suitable solvents are those which prac-tically do not intervene in the polymerization and do not react with the monomers. Such solvents, which may be used alone or as a mixture, are, for example, acetone, methyl ethyl ketone, diethyl ketone, cyclohexanone, tetrahydrofuran dioxane, ethyl acetate, ethyl propionate, aromatic hydrocarbons, such as benzene, toluene, xylene, cumene, tetralin and solvent naphtha (e.g. Solvesso® 150), aliphatic hydrocarbons, such as pentane, hexane, heptane, octane, isooctane, cyclohexane, decalin and Shellsol® D 70, and halogenated, aliphatic hydrocarbons, such as dichloromethane, dichloroethane and trichloroethane.

Solvesso® 150 is Exxon Chemical GmbH's name for an aromatic solvent fraction boiling within the range from 187 to 203° C. It contains about 99% of aromatics. Shellsol® D 70 is Shell's name for a dearomatized, aliphatic hydrocarbon mixture boiling within the range from 195 to 245° C.

A preferably used solvent is acetone, methyl ethyl ketone, toluene, xylene, tetralin, decalin, solvent naphtha (such as Solvesso® 150) or Shellsol® D 70.

The copolymerization of the components A, B, C and, if desired, D is carried out as a rule in the presence of compounds which decompose into free radicals under the polymerization conditions. Suitable polymerization initiators of this type are, for example, hydrogen peroxide, organic peroxides and hydroperoxides, azo compounds and peroxodisulfates. The polymerization can also be carried out by the action of high-energy radiation or by irradiation of the reaction mixture in the presence of a photoinitiator, such as benzoin.

Initiators should preferably have a half-life of <10 hours at the chosen polymerization temperatures. Preferably used polymerization initiators are tert-butyl perpivalate, dilauryl peroxide, tert-butyl per-2-ethylhexanoate (butyl peroctanoate), tert-butyl perbenzoate, dicumyl peroxide, di-tert-butyl peroxide, 2,2'-azobis(2-methylpropionitrile) or mixtures thereof. The half-lives of the stated peroxides can be reduced by the presence of redox coinitiators, such as benzoin or dimethylaniline, and of organic soluble complexes or salts of heavy metals, such as copper, cobalt, manganese, iron, nickel or chromium.

The polymerization initiators which decompose into free radicals are used in conventional amounts, such as from 0.1 to 5.0 mol %, based on the total weight of the monomers used in the polymerization.

The polymerization can, if desired, be carried out in the presence of conventional regulators, such as mercaptoethanol, mercaptopropanol, mercaptoacetic acid, mercaptopropionic acid, thiolactic acid, n-butyl mercaptan, tert-butyl mercaptan, octyl mercaptan and dodecyl mercaptan. Further suitable regulators are aldehydes, such as acetaldehyde, propionaldehyde, butyraldehyde, formic acid and buten-1-ol.

The polymerization is preferably carried out in stirred kettles which are equipped, for example, with an anchor stirrer, paddle stirrer or impeller stirrer. The copolymerization can be carried out, for example, as a solution, precipitation or suspension polymerization.

In the case of the precipitation and suspension polymerization, it may be advantageous to carry out polymerization additionally in the presence of protective colloids. Suitable protective colloids are, for example, copolymers of maleic anhydride and vinyl alkyl ethers which carry 1 to 20 carbon atoms in the alkyl radical or copolymers of maleic anhydride, monoesters thereof with $C_{10}$–$C_{30}$-alcohols or monoamides with $C_{10}$–$C_{20}$-amines and olefins of 8 to 30 carbon atoms. Polyalkyl vinyl ethers whose alkyl group contains 1 to 20 carbon atoms, such as polymethyl, polyethyl and polyisobutyl vinyl ether, are also suitable. If a protective colloid is used in the copolymerization, the effective amounts are from 0.05 to 4.0 mol %, based on the monomers A, B, C and, if desired, D to be polymerized.

The concentration of the monomers in the inert organic solvents is in general from 5 to 80, preferably from 15 to 60, mol %. The polymerization temperature is as a rule from 40 to 160° C., preferably from 50 to 150° C.

After the end of the polymerization, the copolymers can be isolated, for example by distilling off the solvent used in the polymerization or by precipitating the copolymers with a suitable solvent. The copolymers then remain as a powder residue.

The weight average molecular weight of the novel copolymers is in general from 300 to 50,000, preferably from 600 to 20,000.

Modification of the Copolymers

The copolymers can be used as such in mineral oil middle distillates or can be first completely or partially modified by polymer-analogous reactions.

The novel copolymers contain, as reactive groups, in particular carboxyl, anhydride, ester and 4-ring lactone structural units. In addition to simple hydrolysis with water, reactions with NH-, SH- and OH-functional compounds are also advantageous. Apart from the direct esterification of carboxylic acid, anhydride or lactone units, the transesterification of carboxylic ester units based on lower alcohols with longer-chain alcohols is also possible here.

Suitable reactants are, for example, those of the above formula (IV), as well as alcohols, phenols, mercaptans, oximes, imines and primary and secondary amines. The reaction of the copolymers can be carried out here in the organic solvent in which the copolymerization was also carried out, or the solvents used are first distilled off and the corresponding reactions then carried out.

The alcohols used may be in particular branched or straight-chain $C_1$–$C_{30}$-alkyl alcohols or alkenyl alcohols, preferably $C_{10}$–$C_{30}$-alkyl or alkenyl alcohols, such as decanol, dodecanol, isotridecanol, tetradecanol, stearyl alcohol, tallow fatty alcohol or behenyl alcohol.

Alkoxylates of alcohols, amines, amides or carboxylic acids may also be used, such as alkoxylation products of distearylamine, oleylamine, di-coconut fatty amine, aminopropylstearylamine, di-tallow fatty amine, hydrogenated di-tallow fatty amine, stearyl alcohol, isotridecanol, isotridecylamine and behenyl alcohol.

The amines used may be primary or secondary $C_1$–$C_{10}$-alkylamines, preferably $C_1$–$C_6$-alkylamines, polyetheramines or polyamines.

Examples of primary or secondary amines are isotridecylamine, stearylamine, coconut fatty amine, distearylamine, di-tallow fatty amine, dioleylamine and di-coconut fatty amine. It is also possible to use polyamines, such as aminopropylstearylamine, aminopropyllaurylamine, N,N-dimethylpropylenediamine or N,N-dimethyldipropyltriamine. Other suitable amine components are aminopropylated alcohols, aminated alkoxylates or aminopropylated alkoxylates, such as aminopropylstearyl alcohol, aminopropylethoxystearylamine, fatty alkyl polyethylene glycol amine (such as aminated Lutensol® brands from BASF Aktiengesellschaft).

The reaction of the novel copolymers with alcohols and/or amines or derivatives thereof is carried out in the absence of a solvent or in those solvents which in general themselves contain no acidic hydrogen atoms. It is possible to use the same solvents as in the polymerization. The reaction need not go to completion. The amido, imido and ester groups formed during the reaction and the decrease in the 4-ring lactone and possibly in the carboxylic anhydride units can be monitored by IR spectroscopy. Where the novel copolymers contain car-boxyl or anhydride functions, a decrease in the acid number [mg KOH/g] may be observed simultaneously.

Based on their convertible OH or NH equivalents, the alcohol or amine component is usually used in amounts from 0.1 to 3 equivalents per equivalent of carboxylic acid groups in the polymerized amount of dicarboxylic acid or dicarboxylic acid derivative and/or polymerized lactone units. Amounts of from 0.5 to 2 equivalents of NH or OH functions per reactive center in the novel copolymer are preferred.

Copolymers based on ethylenically unsaturated dicarboxylic esters, diketene and vinyl esters or corresponding reaction products of the resulting novel polymers with n-alkyl alcohols, such as dodecanol, tetradecanol, stearyl alcohol, behenyl alcohol or mixtures of alcohols having different alkyl chain lengths and with primary and secondary alkyl- or alkyleneamines have proven particularly advantageous flow improvers for middle distillates.

The novel, unmodified or modified copolymers are used as additives for mineral oil middle distillates, which are understood as meaning petroleum, light heating oil and diesel fuels having a boiling point of from about 150 to 400° C. The copolymers may be added to the middle distillates directly but are preferably added as a 20 to 70 mol % solution. Suitable solvents are aliphatic or aromatic solvents, such as toluene, xylene, decalin and mixtures thereof, as well as high-boiling mixtures of aromatics and/or mixtures of aliphatics, and mineral oil middle distillates. The amount of copolymers in the mineral oil middle distillates is as a rule from 10 to 10,000, preferably from 20 to 5000, particularly preferably from 50 to 1000, ppm.

Depending on the intended use, the mineral oil middle distillates may contain further additives, such as flow improvers, paraffin dispersants, antifoams, corrosion inhibitors, antioxidants, emulsifiers, lubricity additives, detergents, cetane number improvers, conductivity improvers and/or dyes.

Combinations of different flow improvers and/or paraffin dispersants are often used in mineral oil middle distillates. Suitable co-active ingredients are, for example, ethylene/vinyl ester copolymers, as described in DE-A-19 14 756 and EP-A-0 486 836, and/or α-olefin/maleic ester copolymers (EP-A-0 214 876) and/or alkyl fumarate/vinyl acetate copolymers (EP-B-0 153 176).

However, copolymers which are equally suitable as co-active ingredients are those which also contain further comonomers in addition to ethylene, vinyl esters and/or unsaturated mono- and/or dicarboxylic esters. The molecular weight ($M_w$) of these flow improvers is as a rule from 500 to 50,000, preferably from 1000 to 20,000.

In mineral oil middle distillates, regardless of their origin, the novel copolymers in combination with conventional flow improvers based on ethylene/vinyl carboxylate copolymers result in a substantial improvement in the low-temperature flow properties by virtue of the fact that they modify the crystal shape and crystal size in such a way that there are no blockages of filters and fines by paraffin crystals.

It has been found that, particularly in critical middle distillates in which conventional flow improvers alone are not sufficiently effective, the addition of the novel copolymers in combination with conventional flow improvers based on ethylene/vinyl carboxylate copolymers leads to substantially improved cold flow behavior (decrease in CFPP) of the middle distillates.

The present invention therefore relates to a mixture of 5 to 95% by weight of at least one copolymer as described above and from 5 to 95% by weight of at least one ethylene/vinyl carboxylate copolymer. The mixture may, if required, be dissolved in a solvent as mentioned above. Both the copolymers and the mixtures, if desired as a 20 to 70 mol % solution in a solvent, may be used as an additive for mineral oil middle distillates, in particular as flow improvers or paraffin dispersants.

The present invention also relates to a corresponding concentrate containing from 20 to 70% by weight of at least one copolymer as described above and/or of a mixture as described above, dissolved in a solvent.

The present invention furthermore relates to a mineral oil middle distillate containing at least one copolymer as described above and/or a mixture as described above and/or a concentrate as described above.

The Examples which follow illustrate the invention.

EXAMPLES

In the Examples which follow, percentages are by weight. The K values were determined according to H. Fikentscher, Cellulosechemie, 13 (1932), 58–64 and 71–74.

A: Preparation of the Copolymers

For the preparation of the copolymers, a glass reactor provided with a stirrer and three feeds was used. During the polymerization, a gentle nitrogen stream was passed through the reaction solution. The IR spectra of the copolymers has a characteristic band at 1840 cm$^{-1}$ (4-ring lactone) and, in the case of the copolymers containing dicarboxylic anhydride, an additional band at 1780 cm$^{-1}$ (anhydride).

Example A1

49.0 g of maleic anhydride, 0.7 g of a polyvinyl ethyl ether having a K value of 60 (1% strength in THF) and 47 g of Solvesso® 150 from Esso were initially taken in the reactor and heated to 100° C. while flushing with nitrogen. Thereafter, 8.4 g of diketene dissolved in 34 g of Solvesso® 150 and simultaneously 34.4 g of vinyl acetate were metered in uniformly over 3 hours. At the same time, a solution of 2.3 g of tert-butyl per-2-ethylhexanoate in 20 g of Solvesso® 150 was added in the course of 4.5 hours. After the end of the initiator addition, the reaction mixture was polymerized for a further 1.5 hours at 100° C. A yellow finely divided viscous suspension having a solids content of 48.9% was obtained.

Example A2

49.0 g of maleic anhydride, 0.7 g of a polyvinyl ethyl ether having a K value of 60 (1% strength in THF) and 47 g of Solvesso® 150 were initially taken in the reactor and heated to 100° C. while flushing with nitrogen. Thereafter, 12.6 g of diketene dissolved in 50 g of Solvesso® 150 and simultaneously 30.1 g of vinyl acetate were metered in uniformly over 3 hours. At the same time, a solution of 2.3 g of tert-butyl per-2-ethyl-hexanoate in 20 g of Solvesso® 150 was added in the course of 4.5 hours. After the end of the initiator addition, the reaction mixture was polymerized for a further 1.5 hours at 100° C. and diluted with 50 g of Solvesso® 150. A yellow finely divided viscous suspension having a solids content of 38.8% was obtained.

Example A3

49.0 g of maleic anhydride, 0.7 g of a polyvinyl ethyl ether having a K value of 60 (1% strength in THF) and 47 g of Solvesso® 150 were initially taken in the reactor and heated to 100° C. while flushing with nitrogen. Thereafter, 8.4 g of diketene dissolved in 34 g of Solvesso® 150 and simultaneously 40.0 g of vinyl propionate were metered in uniformly over 3 hours. At the same time, a solution of 2.45 g of tert-butyl per-2-ethyl-hexanoate in 25 g of Solvesso® 150 was added in the course of 4.5 hours. After the end of the initiator addition, the reaction mixture was polymerized for a further 1.5 hours at 100° C. and diluted with 50 g of Solvesso® 150. A yellow finely divided viscous suspension having a solids content of 47.6% was obtained.

Example A4

49.0 g of maleic anhydride, 0.7 g of a polyvinyl ethyl ether having a K value of 60 (1% strength in THF) and 35 g of Solvesso® 150 were initially taken in the reactor and heated to 100° C. while flushing with nitrogen. Thereafter, 12.6 g of diketene dissolved in 50 g of Solvesso® 150 and simultaneously 35.0 g of vinyl propionate were metered in uniformly over 3 hours. At the same time, a solution of 2.45 g of tert-butyl per-2-ethyl-hexanoate in 20 g of Solvesso® 150 was added in the course of 4.5 hours. After the end of the initiator addition, the reaction mixture was polymerized for a further 1.5 hours at 100° C. and diluted with 50 g of Solvesso® 150. A yellow finely divided viscous suspension having a solids content of 47.8% was obtained.

Example A5

80.4 g of maleic anhydride, 1.12 g of a polyvinyl ethyl ether having a K value of 60 (1% strength in THF) and 80 g of Solvesso® 150 were initially taken in the reactor and heated to 100° C. while flushing with nitrogen. Thereafter, 34.4 g of diketene dissolved in 138 g of Solvesso® 150 and simultaneously 35.3 g of vinyl acetate were metered in uniformly over 3 hours. At the same time, a solution of 7.5 g of tert-butyl per-2-ethyl-hexanoate in 36 g of Solvesso® 150 was added in the course of 4.5 hours. After the end of the initiator addition, the reaction mixture was polymerized for a further 1.5 hours at 100° C. and diluted with 30 g of Solvesso® 150. A yellow finely divided viscous suspension having a solids content of 33.9% was obtained.

Example A6

80.9 g of maleic anhydride, 1.12 g of a polyvinyl ethyl ether having a K value of 60 (1% strength in THF) and 80 g of Solvesso® 150 were initially taken in the reactor and heated to 100° C. while flushing with nitrogen. Thereafter, 48.5 g of diketene dissolved in 194 g of Solvesso® 150 and simultaneously 21.3 g of vinyl acetate were metered in uniformly over 3 hours. At the same time, a solution of 7.5 g of tert-butyl per-2-ethyl-hexanoate in 36 g of Solvesso® 150 was added in the course of 4.5 hours. After the end of the initiator addition, the reaction mixture was polymerized for a further 1.5 hours at 100° C. and diluted with 30 g of Solvesso® 150. A yellow finely divided viscous suspension having a solids content of 29.1% was obtained.

Example A7

96.2 g of a dialkyl fumarate, prepared from fumaric acid and a $C_{12/14}$ fatty alcohol cut (Nafol® 1412H, commercial product from Condea), and 20.2 g of xylene were initially taken in the reactor. The initially taken mixture was heated to 105° C. while flushing with nitrogen and then 1.7 g of diketene, dissolved in 6.7 g of toluene, and simultaneously 15.5 g of vinyl acetate were metered in over three hours. At the same time, a solution of 5.7 g of tert-butyl per-2-ethylhexanoate in 15 g of toluene was added in the course of 4 hours. After the end of the initiator addition, the reaction mixture was polymerized for a further hour at 105° C. A yellow, slightly viscous solution having a solids content of 71.1% was obtained.

Example A8

80.7 g of a dialkyl fumarate, prepared from fumaric acid and a $C_{12/14}$ fatty alcohol cut (Nafol® 1412H, commercial product from Condea), and 16.9 g of xylene were initially taken in the reactor. The initially taken mixture was heated to 105° C. while flushing with nitrogen and then 7.0 g of diketene, dissolved in 7.0 g of toluene, and simultaneously 7.2 g of vinyl acetate dissolved in 7.2 g of toluene were metered in over three hours. At the same time, a solution of 4.7 g of tert-butyl per-2-ethylhexanoate in 15 g of toluene was added in the course of 4 hours. After the end of the initiator addition, the reaction mixture was polymerized for a further hour at 105° C. A yellow, slightly viscous solution having a solids content of 64.5% was obtained.

Example A9

69.1 g of a dialkyl fumarate, prepared from fumaric acid and a $C_{12/14}$ fatty alcohol cut (Nafol® 1412H, commercial product from Condea), and 14.5 g of xylene were initially taken in the reactor. The initially taken mixture was heated to 105° C. while flushing with nitrogen and then 11.0 g of diketene, dissolved in 12.0 g of toluene, and simultaneously 1.0 g of vinyl acetate were metered in over three hours. At the same time, a solution of 4.05 g of tert-butyl per-2-ethylhexanoate in 16 g of toluene was added in the course of 4 hours. After the end of the initiator addition, the reaction mixture was polymerized for a further hour at 105° C. A yellow, slightly viscous solution having a solids content of 62.1% was obtained.

Example A10

84.0 g of a dialkyl fumarate, prepared from fumaric acid and a $C_{12}$–$C_{16}$ fatty alcohol cut (mixture of 75% by weight of Nafol® 1412H, commercial product from Condea, and 25% by weight of Lorol® C-16, commercial product from Henkel), and 20.0 g of Solvesso® 150 were initially taken in the reactor. The initially taken mixture was heated to 105° C. while flushing with nitrogen and then 1.4 g of diketene, dissolved in 5.0 g of Solvesso® 150 and simultaneously 12.9 g of vinyl acetate dissolved in 7.1 g of Solvesso® 150 were metered in over three hours. At the same time, a solution of 4.9 g of tert-butyl per-2-ethylhexanoate in 15.1 g of Solvesso® 150 was added in the course of 4 hours. After the end of the initiator addition, the reaction mixture was polymerized for a further hour at 105° C. A brownish yellow, slightly viscous solution having a solids content of 62.7% was obtained.

Example A11

84.3 g of a dialkyl fumarate, prepared from fumaric acid and a $C_{12}$–$C_{16}$ fatty alcohol cut (mixture of 75% by weight of Nafol® 1412H, commercial product from Condea, and 25% by weight of Lorol® C-16, commercial product from Henkel), and 20.0 g of Solvesso® 150 were initially taken in the reactor. The initially taken mixture was heated to 105° C. while flushing with nitrogen and then 7.0 g of diketene, dissolved in 7.0 g of Solvesso® 150 and simultaneously 7.2 g of vinyl acetate dissolved in 7.2 g of Solvesso® 150 were metered in over three hours. At the same time, a solution of 4.9 g of tert-butyl per-2-ethylhexanoate in 15.0 g of Solvesso® 150 was added in the course of 4 hours. After the end of the initiator addition, the reaction mixture was polymerized for a further hour at 105° C. A brownish yellow, slightly viscous solution having a solids content of 62.0% was obtained.

Example A12

84.0 g of a dialkyl fumarate, prepared from fumaric acid and a $C_{12}$–$C_{16}$ fatty alcohol cut (mixture of 75% by weight of Nafol® 1412H, commercial product from Condea, and 25% by weight of Lorol® C-16, commercial product from Henkel), and 20.0 g of Solvesso® 150 were initially taken in the reactor. The initially taken mixture was heated to 105° C. while flushing with nitrogen and then 13.0 g of diketene, dissolved in 14.0 g of Solvesso® 150 and simultaneously 1.0 g of vinyl acetate were metered in over three hours. At the same time, a solution of 4.9 g of tert-butyl per-2-ethylhexanoate in 15.1 g of Solvesso® 150 was added in the course of 4 hours. After the end of the initiator addition, the reaction mixture was polymerized for a further hour at 105° C. A brownish yellow, slightly viscous solution having a solids content of 62.0% was obtained.

B: Reaction of the Polymers From Examples A1 to A6 With Fatty Alcohols

General Method

The appropriate amount of the respective fatty alcohol of the fatty alcohol mixture and the stated amount of p-toluenesulfonic acid (p-TSA) was added to the amount, stated in Table 1 below, of a polymer solution from Examples A1) to A6) and the mixture was heated to about 150° C. The reaction solution was stirred at this temperature for about 10 hours and the resulting water of reaction was removed. The end of the reaction was detectable by IR spectroscopy. The carbonyl vibration of 4-ring lactone of the carboxylic anhydride group at 1840 cm$^{-1}$ decreased while an ester band appeared at 1730 cm$^{-1}$.

TABLE 1

| Example | Polymer solution from Example | Alcohol component | p-TSA | Solids content |
|---|---|---|---|---|
| B1 | 43.5 g A1 (36.8% strength) | 35.2 g Nafol ® 1412H | 0.25 g | 65.0% |
| B2 | 27.0 g A1 (42.3% strength) | 40.0 g Nafol ® 1618/Nafol ® 1822 (1:1) | 0.21 g | 52.9% |
| B3 | 27.0 g Al (42.3% strength) | 36.4 g Nafol ® 1412H/Nafol ® 1822 (1:1) | 0.21 g | 46.2% |
| B4 | 27.0 g A1 (42.3% strength) | 36.6 g Nafol ® 1412H/1618/1822 (1:1:1) | 0.21 g | 49.0% |
| B5 | 33.0 g A2 (38.8% strength) | 35.2 g Nafol ® 1618 | 0.20 g | 70.0% |
| B6 | 20.6 g A2 (38.85% strength) | 25.3 g Nafol ® 1618 | 0.13 g | 71.0% |
| B7 | 23.1 g A2 (38.8% strength) | 22.2 g Nafol ® 1412H/1618 (1:1) | 0.14 g | 69.0% |
| B8 | 33.7 g A3 (47.6% strength) | 33.3 g Nafol ® 1412H | 0.40 g | 62.1% |
| B9 | 27.0 g A3 (47.6% strength) | 33.0 g Nafol ® 1618 | 0.32 g | 75.5% |
| B10 | 33.5 g A4 (47.8% strength) | 34.4 g Nafol ® 1412H | 0.40 g | 62.6% |
| B11 | 26.8 g A4 (47.8% strength) | 33.0 g Nafol ® 1618 | 0.32 g | 60.1% |
| B12 | 40.0 g A5 (33.9% strength) | 57.2 g Nafol ® 1618/1822 (1:1) | 0.41 g | 72.0% |
| B13 | 40.0 g A6 (29.1% strength) | 51.0 g Nafol ® 1412H/1822 (1:1) | 0.35 g | 69.0% |
| B14 | 40.0 g A6 (29.1% strength) | 51.0 g Nafol ® 1412H/1618/1822 (1:1:1) | 0.35 g | 69.0% |

C: Reaction of the Polymers From Examples A5 and A6 With Amines

Example C1

29.0 g of polymer solution from Example A5 (35.4% strength) were diluted with 27.0 g of Solvesso® 150, and 38.5 g of N,N-di-tallow fatty amine (hydrogenated, Armeen® 2HT, commercial product from Akzo) were added. The reaction solution was then stirred for about 5 hours at 100° C. The end of the reaction was detectable by IR spectroscopy. The carbonyl vibration of the 4-ring lactone or of the carboxylic anhydride group at 1840 cm$^{-1}$ decreased while an amide band appeared at 1650 and 1680 cm$^{-1}$, respectively. At the same time, a decrease in the acid number was observed. A reddish brown clear solution having a solids content of 51.0% was obtained.

Example C2

22.9 g of polymer solution from Example A6 (30.5% strength) were diluted with 21.0 g of Solvesso® 150, and 30.3 g of N,N-di-tallow fatty amine (hydrogenated, Armeen® 2HT, commercial product from Akzo) were added. The reaction solution was then stirred for about 5 hours at 100° C. The end of the reaction was detectable by IR spectroscopy. The carbonyl vibration of the 4-ring lactone or of the carboxylic anhydride group at 1840 cm$^{-1}$ decreased while an amide band appeared at 1650 and 1680 cm$^{-1}$, respectively. At the same time, a decrease in the acid number was observed. A reddish brown clear solution having a solids content of 49.6% was obtained.

Testing of Performance Characteristics of the Mineral Oil Middle Distillate Compositions The novel mixtures were tested in four middle distillates. These are diesel fuels and fight heating oils of commercial European refinery quality; they are designated as MD 1, MD 2, MD 3 and MD 4 and are characterized by the following physical data:

|  | MD 1 | MD 2 | MD 3 | MD 4 |
|---|---|---|---|---|
| Cloud point (° C.) acc. to ISO 3015 | +3 | −4 | +6 | −4 |
| CFPP (° C.) according to EN 116 | 0 | −10 | +3 | −10 |
| Density at 15° C. (kg/m$^3$) according to ASTM D 4052 | 845 | 819 | 852 | 821 |
| Distillation according to ISO 3405: | | | | |
| Initial boiling point (° C.) | 182 | 163 | 162 | 158 |
| 10% boiling point (° C.) | 217 | 192 | 194 | 191 |
| 20% boiling point (° C.) | 237 | 202 | 210 | 205 |
| 50% boiling point (° C.) | 289 | 242 | 262 | 245 |
| 70% boiling point (° C.) | 324 | 277 | 297 | 282 |
| 90% boiling point (° C.) | 360 | 324 | 348 | 337 |
| 95% boiling point (° C.) | 374 | 347 | 371 | 361 |
| Final boiling point (° C.) | 390 | 370 | 384 | 376 |

The Following Mineral Oil Distillate Compositions Were Also Tested

Mineral oil middle distillate compositions containing one of the following novel mixtures M-A7 to M-A12, M-B1 to M-B14 and M-C1 to M-C2, which are 1:4 combinations of one of the compounds of Examples A7 to A12, B1 to B14 or C1 or C2, 50% strength in solvent naphtha, and a product based on ethylene/vinyl propionate, which is marketed under the trade name Keroflux® 3267 by BASF AG. Keroflux® 3267 (V1) alone and its 4:1 mixture with the mixture from Example C$_2$ of WO 95/25755 (V2) served as a comparison.

The novel combinations or the combinations of the Comparative Examples in the amounts stated in the Table below were added to the above middle distillates at 40° C. while stirring, and the mixture was then cooled to room temperature.

The cold filter plugging point (CFPP) according to EN 116 was then determined. The results are likewise summarized in Table 2 below. They show that the novel mixtures M-A7 to M-A12, M-B1 to M-B14 and M-C1 to M-C2 lead to better CFPP response behavior of the middle distillates than Keroflux® 3267 alone (V1) or its 4:1 mixture with the mixture from Example C2 of WO 95/25755 (M-V2).

TABLE 2

Determination of the CFPP (° C.) according to EN 116

| Example | Mixture tested: | MD 1 300 ppm | MD2 200 ppm | MD3 500 ppm | MD4 50 ppm |
|---|---|---|---|---|---|
| B1 | M-B1 | −12 | −21 | | |
| B2 | M-B2 | −13 | | | |
| B3 | M-B3 | −14 | | | |
| B4 | M-B4 | −15 | | | |

TABLE 2-continued

Determination of the CFPP (° C.) according to EN 116

| Example | Mixture tested: | MD 1 300 ppm | MD2 200 ppm | MD3 500 ppm | MD4 50 ppm |
|---|---|---|---|---|---|
| B5 | M-B5 | | | −15 | |
| B6 | M-B6 | | | −16 | |
| B7 | M-B7 | −13 | −27 | −14 | −17 |
| B8 | M-B8 | −12 | −21 | | |
| B9 | M-B9 | −12 | | −17 | |
| B10 | M-B10 | −11 | −24 | | |
| B11 | M-B11 | −13 | | −16 | |
| B12 | M-B12 | −11 | | | |
| C1 | M-C1 | −14 | | | |
| B13 | M-B13 | −16 | | | |
| B14 | M-B14 | −16 | | | |
| C2 | M-C2 | −16 | | | |
| A7 | M-A7 | −12 | −27 | | |
| A8 | M-A8 | −14 | −27 | | |
| A9 | M-A9 | −13 | −29 | | |
| A10 | M-A10 | −13 | −26 | | |
| A11 | M-A11 | −14 | −25 | | |
| A12 | M-A12 | −14 | −24 | | |
| V1 | — | −10 | −18 | −13 | 14 |
| V2 | M-V2 | | −16 | −2 | −10 |

We claim:

1. A copolymer of the monomers of the following components A to D, the total amount by weight of which is 100 mol %:

a: from 20 to 80 mol % o at least one ethylenically unsaturated dicarboxylic acid or of an anhydride, ester or amide thereof as component A, b: from 1 to 79 mol % of at least one diketene of the formula (I)

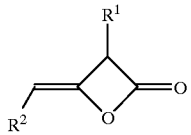

(I)

where $R^1$ and $R^2$ independently are each hydrogen or $C_1$–$C_{30}$-alkyl, as component B, c: from 1 to 79 mol % of at least one vinyl ester, alkyl (meth)acrylate, (meth)acrylonitrile or mixtures thereof as component C and d: from 0 to less than 0.5 mol % or, if at least one further olefinically unsaturated monomer as component D.

2. A copolymer as claimed in claim 1, having one or more of the following features:

compounds of the formula (II)

$$R^4\text{—OC—}R^3C\text{=}CR^5\text{—CO—}R^6 \quad (II)$$

where $R^3$ and $R^5$ independently are each hydrogen or $C_1$–$C_{22}$-alkyl and $R^4$ and $R^6$ independently are each hydrogen or —$OR^8$ or $NR^9R^{10}$, or, in the case of cis-dicarboxylic acid compounds, $R^4$ and $R^6$ together are —O— or —N $R^{11}$— and $R^7$ and $R^{11}$ independently are each $C_1$–$C_{22}$-alkyl, $C_1$–$C_{22}$-hydroxyalky or $C_2$–$C_{22}$-alkenyl, each of which may be interrupted by up to 3 oxygen atoms or aminoalkylated, or a polyether radical or polyamine radical, are used as component A, vinyl esters of aliphatic $C_1$–$C_6$-carboxylic acids, alkyl (meth)acrylates with aliphatic $C_1$–$C_{12}$-alcohols, (meth)acrylonitrile or mixtures thereof are used as component C, at least one compound of the formula (III)

$$H_2C\text{=}CR^{12}R^{13} \quad (III)$$

where $R^{12}$ is hydrogen or $C_1$–$C_{12}$-alkyl and $R^{13}$ is $C_1$–$C_{12}$-alkyl, $C_2$–$C_{22}$-alkenyl or $C_2$–$C_{12}$-aryl is used as component D.

3. A copolymer as claimed in claim 2, wherein the NH- or OH-functional compound is of the formula (IV)

$$A\text{—}[CHR^{14}\text{—}CHR^{15}\text{—}O\text{—}]_m[CHR^{16}\text{—}(CH_2\text{—})_x NH\text{—}]_n H \quad (IV)$$

where m is from 0 to 100, n and x are each from 0 to 5, $R^{14}$, $R^{15}$ and $R^{16}$ independently are each hydrogen or $C_1$–$C_6$-alkyl and A is $C_2$–$C_{30}$-alkoxy or $NR^{17}R^{18}$, where one of the radicals $R^{17}$ and $R^{18}$ may be hydrogen and at least one of the radicals $R^{17}$ and $R^{18}$ differs from hydrogen and is $C_1$–$C_{30}$-alkyl or $C_2$–$C_{30}$-alkenyl or —[$CHR^{19}$—$CHR^{20}$—O—]$_p$H, $R^{19}$ and $R^{20}$ independently each being hydrogen or $C_1$–$C_6$-alkyl and p being from 1 to 100.

4. A process for the preparation of a copolymer as claimed in claim 1, wherein the monomers of components A to D are reacted in the stated ratio in the presence of a free radical polymerization initiator.

5. A process as claimed in claim 4, wherein the copolymerization of the monomers is carried out in a first step, at least one ethylenically unsaturated carboxylic acid or an anhydride or ester thereof being used as component A and, in a second step, the copolymer obtained is reacted with an OH- or NH-functional compound.

6. A mixture of from 5 to 95% by weight of at least one copolymer as claimed in claim 1 and and from 5 to 95% by weight of at least one ethylene/vinyl carboxylate copolymer.

7. A concentrate containing from 20 to 70% by weight of at least one copolymer as claimed in claim 1.

8. A concentrate containing from 20 to 70% by weight of a mixture as claimed in claim 6, dissolved in a solvent.

9. A mineral oil middle distillate containing at least one copolymer as claimed in claim 1.

* * * * *